No. 634,704. Patented Oct. 10, 1899.
W. T. SHRYOCK.
BRAKE APPLIANCE.
(Application filed Mar. 6, 1899.)
(No Model.) 2 Sheets—Sheet 1.
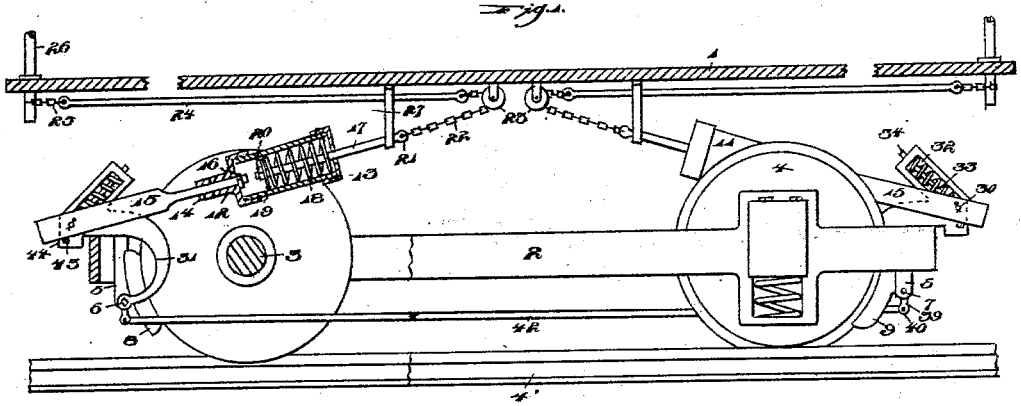
WITNESSES:
INVENTOR
William T. Shryock.
BY
ATTORNEYS

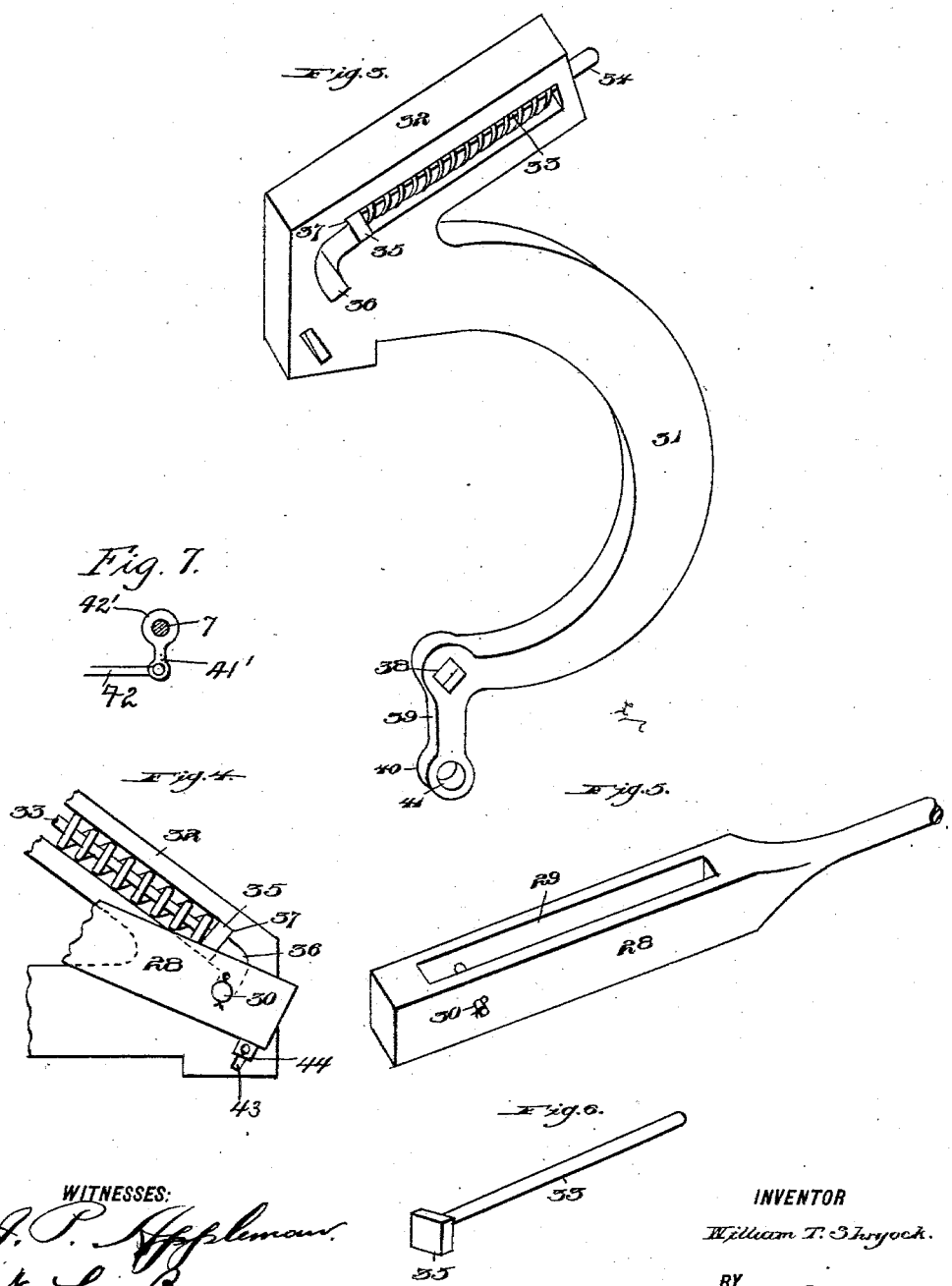

UNITED STATES PATENT OFFICE.

WILLIAM T. SHRYOCK, OF ALLEGHENY, PENNSYLVANIA.

BRAKE APPLIANCE.

SPECIFICATION forming part of Letters Patent No. 634,704, dated October 10, 1899.

Application filed March 6, 1899. Serial No. 707,929. (No model.)

*To all whom it may concern:*

Be it known that I, WILLIAM T. SHRYOCK, a citizen of the United States of America, residing at Allegheny, in the county of Allegheny and State of Pennsylvania, have invented certain new and useful Improvements in Brake Appliances, of which the following is a specification, reference being had therein to the accompanying drawings.

My invention relates to certain new and useful improvements in car-brake appliances.

My invention is particularly adapted for use in connection with car-brakes; and the object thereof is to obtain a more effectual stoppage when the brake-shoes are applied to the wheels.

In various brakes in use the action thereof upon the truck-frame when operated is that the weight upon the same is partially shifted forward of the center of gravity. This shifting of the weight upon the forward wheels or pairs of wheels, as the case may be, in single or double trucks increases thereby the pressure of the same upon the rails and removes a proportional part of pressure from the rear wheels or pairs of wheels, as the case may be, in single or double trucks. This causes what is generally termed "skidding" of the wheels, oftentimes resulting in the flattening of the same. To obtain a more effectual stoppage when the brake is applied, as well as to overcome the objections heretofore stated, I increase to a greater degree the pressure of the brake-shoes upon the wheels which have the closest adhesion to the rails, owing to the shifting of the weight—that is to say, the forward wheels or pairs of wheels, as the case may be, in single or double trucks—by means of a compound lever operating the brake-shoes.

My invention finally consists in the novel combination and arrangement of parts hereinafter more fully described, and particularly pointed out in the claim.

In describing the invention in detail reference is had to the accompanying drawings, forming a part of this specification, wherein like numerals of reference indicate corresponding parts throughout the several views thereof, and in which—

Figure 1 is a side view, partly in section, showing my improved device applied to a truck. Fig. 2 is a top plan view of a truck, showing my improved device in position and disconnected from the draft-rod. Fig. 3 is an enlarged perspective view of the main brake-lever. Fig. 4 is a side view of a portion of the lower draft-rod connected to the upper portion of the main brake-lever. Fig. 5 is an enlarged perspective view of the lower draft-rod. Fig. 6 is a perspective view of the compression-rod. Fig. 7 is a side view of the connection for the operating-rod for the rear brake-shoe.

Referring to the drawings by reference-numerals, 1 indicates the bottom of a car or other vehicle to which the truck 2 is suitably connected. Mounted with the truck 2 in any desirable manner are the front and rear axles 3, having the wheels 4 mounted thereon.

4' indicates the rails of a car-track. Connected to the inner face 4² of the truck, on each side thereof and at the front and rear, are the hangers 5, in which are mounted brake-beams 6 7, having the brake-shoes 8 9 loosely connected thereto.

Arranged beneath the bottom of the car are the hollow cylindrical casings 11, which are provided at each end with the caps 12 13. The cap 13 is formed with a hub 14, which acts as a bearing for the lower draft-rod 15, the lower draft-rod 15 being rigidly secured to the cap 12 and held in position by means of the nut 16. The cap 12 is interiorly screw-threaded for securing the same to the end of the cylindrical casing, as shown. The cap 13 is also interiorly screw-threaded for securing the same to the casing 11, and this cap has operating therethrough the auxiliary draft-rod 17, on which is mounted the coiled resistance-spring 18, arranged within the casing 11. The one end of this coiled spring is secured to the washer 19, which is mounted on the auxiliary draft-rod 17, and this washer 19 is secured in position by means of the nut 20.

The outer end of the auxiliary draft-rod 17 is formed with a head 21, which is apertured to receive one end of a chain, rope, or cable 22, which operates over the pulley-wheel 23, supported from the bottom of the car, and the opposite end of this chain, rope, or cable 22 is suitably connected to the brake-rod 24. This brake-rod at its opposite end is connected to a chain, rope, or cable 25 to allow of its operation by means of the ordinary hand-brake 26 or other suitable means.

27 indicates a hanger for supporting the casings, as well as the auxiliary draft-rod 17. This hanger may be of any desired construction.

The lower draft-rod is provided with an enlarged portion, as at 28, which has arranged therein an elongated slot 29 for connecting the same by means of a fastening-pin 30 to the main or compound brake-lever. The main brake-lever is or may be substantially gooseneck in form, as shown at 31, and is provided with an inclined extension or frame 32, within which is arranged the compression-rod 33, the upper end thereof projecting outwardly from the extension or frame, as shown at 34. The lower end of this rod 33 has secured thereto the stop-plate 35, conforming to the opening formed in the extension or frame, within which is mounted the rod 33. At its lower end this opening terminates into an irregular slot 36, thereby forming a shoulder 37, upon which the stop-plate normally rests.

The lower end of the main or compound brake-lever is provided with an aperture 38 for rigidly securing the lever to the brake-beams. Formed integral with the main brake-lever directly beneath the opening 38 is a downwardly-extending projection 39, forming a lever, having the enlarged end 40, within which is arranged the aperture 41 for securing thereto the operating-rod 42 for the rear brake-shoes. This rod 42 is connected at its opposite end to the hanger 41', which is formed integral with the collar 42', mounted on each of the brake-beams 6 7. The upper portion of the main or compound brake-lever is provided with a slot 43, which is adapted to receive a stop-screw 44 for limiting the movement of the lower draft-rod 15.

The operation of my improved device is as follows: The brake being applied, the brake-rod by its connection will draw the auxiliary draft-rod upwardly, moving the same in a counter direction to the movement of the truck. This compresses the spring within the casing 11 and will draw the lower draft-rod in the same direction as the auxiliary draft-rod, which will cause the main or compound brake-lever to move in a counter direction to the movement of the truck, operating the brake-beam and bringing the brake-shoe in engagement with the tread of the forward wheels or pairs of wheels, as the case may be, in single or double trucks. At the same time on the backward movement of the main or compound brake-lever it will carry the operating-rod 42 in the direction the car or truck is moving and bring the rear brake-shoe into engagement with the tread of the rear wheels or pairs of wheels, as the case may be, in single or double trucks. When the brake is released, the parts will immediately resume their normal position.

In the application of compound brakes of this nature it is desirable to avoid the sudden thrust of the brake-shoes into engagement with the wheels, and by the interposing of the spring 18 upon the auxiliary draft-rod 17, within the cylinder 11, this spring acts as a cushion to receive the strain caused by applying the brake, effectually removing such strain from the draft-rod 15, the main brake-lever 31, and the brake-shoes, permitting the latter to be drawn gradually into firm braking engagement with the wheels. It will be observed that when the brake is applied the end of the lower draft-rod carrying the pin 30 will ride up in the irregular slot 36 and against the stop-plate 35. This spring will materially assist the parts in resuming their normal positions. By applying the brake-shoes in the manner set forth the same will be brought into a more effective engagement with the wheels to prevent the skidding of the latter, as the pressure of the brake-shoes has been regulated by the manner of application to conform to the shifting of the weight upon the forward wheels or pairs of wheels, as the case may be. This regulation of the pressure is attained by reason of the arrangement of the compound lever in the manner shown— that is, the upper arm thereof being of greater length than the lower one, or, in other words, the fulcrum-point of the lever being near the lower end thereof—therefore the upper arm of the lever operating in a counter direction to which the car is moving will cause the application of the forward brake-shoes in the same direction, and owing to the compound lever being fulcrumed in the manner shown the brake-shoes will engage the wheels with a greater pressure than if arranged otherwise and obtain a more efficient braking action. Simultaneously with the application of the brake-shoes to the forward wheels of the truck the brake-rod 42, owing to its connection with the lower arm of the compound lever, will cause the rear brake-shoes to engage the rear wheels of the truck. It will also be observed that when the brake is applied the pressure of the brake-shoes upon the forward wheels or pairs of wheels, as the case may be, in single or double trucks will be immediately obtained without jarring, owing, as heretofore stated, to the cushioning of the draft-rods, and that the rear brake-shoes will be brought into engagement with the rear wheels or pairs of wheels, as the case may be, in single or double trucks.

It is thought that the many advantages of my improved device can be readily understood from the foregoing description, taken in connection with the accompanying drawings, by the use of a compound lever for operating a brake, thereby bringing excessive pressure of the brake-shoes upon the forward wheels or pairs of wheels, as the case may be.

It will be noted that various changes may be made in the details of construction without departing from the general spirit of my invention.

Having thus fully described my invention, what I claim as new, and desire to secure by Letters Patent, is—

In a car-brake, a brake-rod operating in the direction the car-truck is moving, an auxiliary draft-rod suitably connected thereto and operating in an opposite direction, a lower draft-rod operating in the same direction, a cushioning connection between the said draft-rods, a compound lever, an inclined extension or frame formed integral with the upper end thereof adapted to be connected to the lower draft-rod, a compression-rod carrying a plate on its lower end arranged in the said frame adapted to be engaged by the lower draft-rod, a tension-spring mounted on the said rod for cushioning the upward movement of the lower draft-rod when the same is brought into engagement with the lower draft-rod, means arranged in the said lever for limiting the movement of the lower draft-rod, a forward brake-shoe, a brake-beam connected to the said lever and operated thereby so as to cause the said brake-shoe to engage the forward side of the forward wheel or wheels of a car-truck, a rear brake-shoe, connection between the said rear brake-shoe and compound lever adapted to be operated by the said lever so as to cause the rear brake-shoe to engage the rear side of the rear wheel or wheels of a car-truck, substantially as set forth.

In testimony whereof I affix my signature in the presence of two witnesses.

WILLIAM T. SHRYOCK.

Witnesses:
JOHN NOLAND,
E. W. ARTHUR.